United States Patent [19]

Shirayama et al.

[11] 4,193,000

[45] Mar. 11, 1980

[54] RADIATION DETECTOR ADAPTED FOR USE WITH A SCANNER

[75] Inventors: Shimpey Shirayama; Chikara Konagai; Michitaka Terasawa, all of Yokohama; Hironobu Kimura, Tokyo, all of Japan

[73] Assignee: Tokyo Shibaura Electric Co., Ltd., Kawasaki, Japan

[21] Appl. No.: 854,255

[22] Filed: Nov. 23, 1977

[30] Foreign Application Priority Data

Nov. 25, 1976 [JP] Japan ................................ 51-140674

[51] Int. Cl.$^2$ ................................................ G01T 1/18

[52] U.S. Cl. ................................................ 250/385

[58] Field of Search ............ 250/385, 374, 375, 445 T

[56] References Cited

U.S. PATENT DOCUMENTS 3,772,521 11/1973 Perez-Mendez ..................... 250/385

3,911,279 10/1975 Gilland et al. ........................ 250/385

4,031,396 6/1977 Whetten et al. ................. 250/445 T

*Primary Examiner*—Davis L. Willis

*Attorney, Agent, or Firm*—Finnegan, Henderson, Farabow & Garrett

[57] ABSTRACT

A compact single- or multi-channel radiation detector capable of sending forth a large and stable output signal by being operated in a proportional region which comprises a single or a plurality of electrode assemblies each prepared by inserting between a pair of mutually facing parallel high voltage electrodes an electric charge-collecting electrode having a plurality of metal wires spatially arranged in a plane parallel with said paired high voltage electrodes, and wherein the single or plural electrode assemblies are received in a case provided with a radiation inlet section and filled with a gaseous element mainly consisting of a rare gas such as argon or xenon.

11 Claims, 7 Drawing Figures

RADIATION DETECTOR ADAPTED FOR USE WITH A SCANNER

This invention relates to a radiation detector, and more particularly to a radiation detector adapted to be used with a computerized tomography scanner which irradiates collimated radiation rays such as X-rays or γ-rays to a foreground subject, for example, a predetermined planar slice of a human body in many directions; arithmetically processes by computer the result of detecting the intensity of penetrating radiation to calculate an absorption coefficient at various parts of the planar slice, thereby producing an image of the planar slice of the body.

The scanner enables a radiation source, for example, an X-ray tube and radiation detector to be moved around and/or in parallel with a resting foreground subject, for example, a human body, thereby making it possible for the radiation detector to determine the intensity of radiation penetrating a predetermined planar slice of the human body with respect to many paths through which the radiation penetrates said planar slice.

The prior art radiation detector used with computerized tomography has been the ionization chamber type or the type in which incoming radiation is converted into a light by a scintillator, and the light thus produced is further amplified by a photomultiplier tube. The reason is that the former ionization chamber type radiation detector having no gas amplification ability generated too low an output for practical application. The prior art radiation detector comprising a scintillator and photomultiplier tube still had many drawbacks, three important ones of which will be described below. The first drawback is that since a scintillator uses an alkali halide such as sodium iodide (NaI) efficiently converting radiation energy into a light energy, a scintillator light contains phosphorescent rays which persist a long time after the scintillator is excited by radiation (said phosphorescent component generally accounts for several percent of the total amount of light rays produced), thus presenting difficulties in collecting data on penetrating radiation at a high speed. The second drawback is that the prior art radiation detector using a photomultiplier is easily affected by terrestrial magnetism, namely, that while the radiation detector is rotated about a foreground subject, the sensitivity of the photomultiplier varies with terrestrial magnetism during the scanning of the foreground subject, resulting in a decline in the precision with which the intensity of penetrating radiation is measured and also an obscure image of a planar slice exposed to radiation.

To produce a planar slice image quickly by computerized tomography, an attempt has been recently made to use fan beam-type radiation, and arrange a large number of radiation detectors in accordance with the expended angle of the radiation, thereby simultaneously obtaining measured data with respect to many directions. The third drawback of the prior art radiation detector using a scintillator and photomultiplier is that since the photomultiplier is large, it is impossible to arrange many radiation detectors close to each other. Where data is to be collected quickly to provide a planar slice image using the above-mentioned fan beam-type radiation, the adjacent radiation detectors should preferably be spaced from each other at a distance smaller than 2mm. But provided in a large number, the conventional radiation detectors using the above-mentioned photomultiplier cannot be arranged closer than 6mm apart.

It is accordingly the object of this invention to provide a compact radiation detector which enables data on the intensity of radiation to be collected quickly without being affected by terrestrial magnetism and which always produces large and stable current.

To this end, the radiation detector of this invention comprises a single or a plurality of electrode assemblies each prepared by inserting between a pair of mutually facing, substantially parallel high voltage electrodes an electric charge-collecting electrode having a plurality of parallel metal wires spatially arranged in a plane substantially parallel with said paired high voltage electrodes. The single or plural electrode assemblies are received in a case provided with a radiation supply section for feeding radiation. The case is filled with a gas which is considered to be impermeable to radiation.

A single electrode assembly positioned in the case constitutes a single radiation detector. A plurality of electrode assemblies positioned in the case provide a multichannel type radiation detector capable of simultaneously detecting radiation at many closely spaced paths.

The radiation detector of this invention has the advantages that the intensity of radiation is detected quickly due to absence of a scintillator; terrestrial magnetism does not exert any effect due to absence of a photomultiplier; close arrangement of the paired high voltage electrodes and electric charge collecting electrode renders the radiation detector very thin, and make it possible to design a small multi-channel radiation detector; and the intensity of radiation is measured at very closely spaced paths. Further advantages of this invention are that if the radiation detector is made to work in a proportional region by controlling collecting voltage being impressed on the radiation detector, then gas amplification takes place in the radiation detector, producing an intense output signal having a good S/N ratio and also causing an output signal to indicate an excellent linear change with respect to the intensity of introduced radiation.

Moreover, the radiation detector of this invention responds to the output signal with little time lag since the electric field around the electric charge-collecting electrode is more intense than in the ionization chamber. Still further, the output signal of the radiation detector is hardly affected by the vibration of the radiation detector since the electrostatic capacitance is small between the high voltage electrodes and the electric charge-collecting electrode comprised of fine metal wires.

This invention can be more fully understood from the following detailed description when taken in conjunction with the accompanying drawings, in which.

Figure 7:
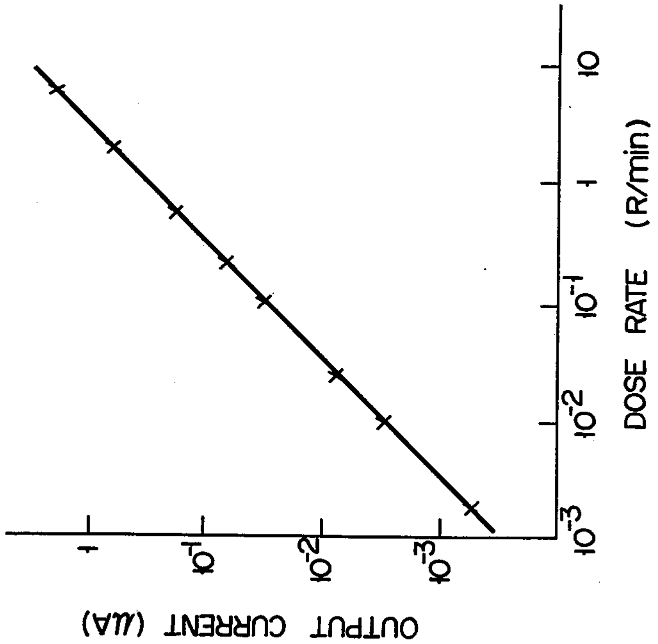
Figure 6:
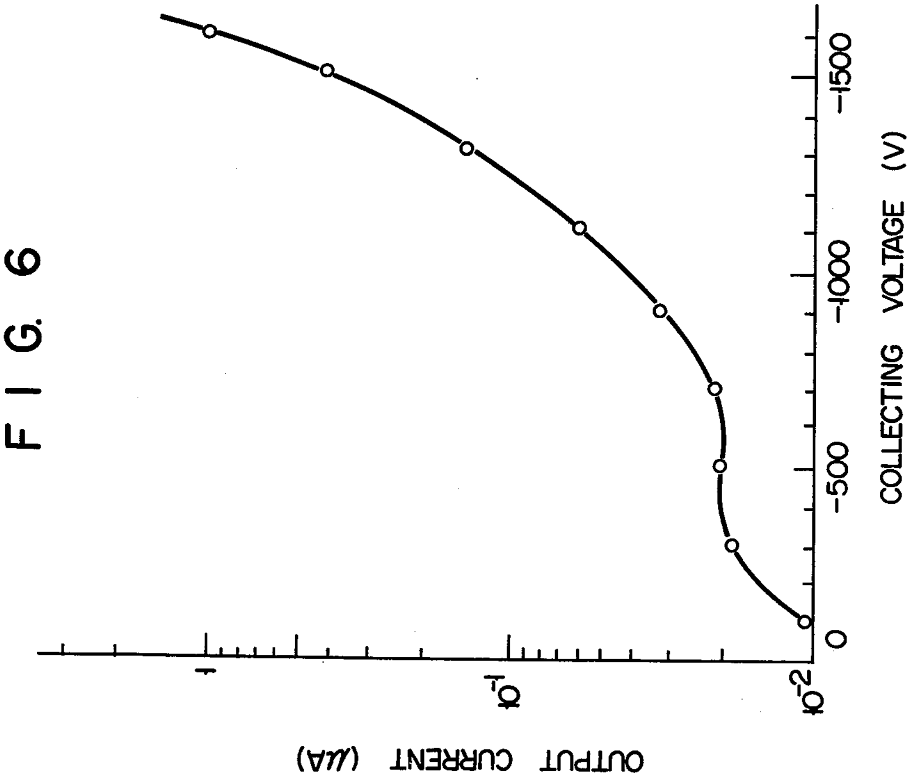

FIG. 6 graphically shows the relationship between the collecting voltage impressed on the radiation detector and ionization current, that is, output current from said radiation detector; and FIG. 7 graphically indicates the relationship between the dose rate of radiation supplied to the radiation detector working in the proportional region and ionization current, that is, output current from the radiation detector.

Figure 1:
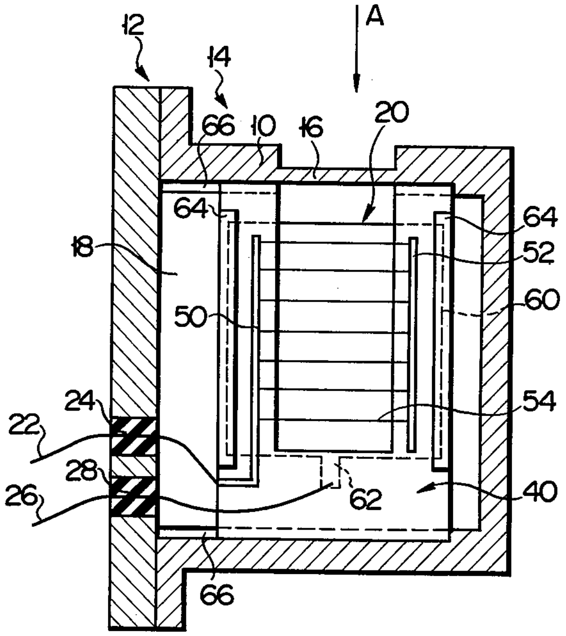
FIG. 1 is a longitudinal sectional view of a single-channel type radiation detector embodying this invention.
Figure 2:
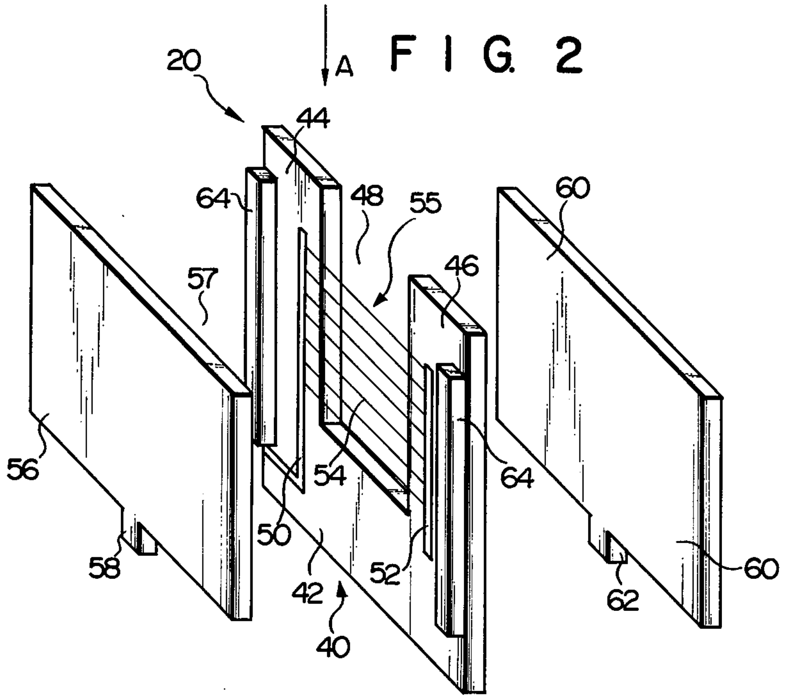
FIG. 2 is an oblique exposed view of the radiation detector of FIG. 1, showing the various types of electrode used therewith.

FIGS. 1 and 2 jointly set forth a single-channel type radiation detector of the simplest arrangement embodying this invention which is designed to measure the intensity of one stream of radiation brought into the radiation detector through a radiation supply section 16.

Referential numeral 10 denotes the body of an aluminum case 14, and 12 the cap thereof. The case body 10 is provided with a radiation supply section 16 having a sufficiently thin wall to admit the passage of radiation introduced in the direction of the indicated arrow A. Fitted to the cap 12 are insulation bushings 24, 28 to lead out electric wires 22, 26 connected to a detection unit 20 placed in a space 18 of the case 14. The case 14 and bushings 24, 28 are so constructed as to render the space 18 airtight.

FIG. 2 is an oblique view of the detection unit 20. Referential numeral 40 is a support board made of insulation material provided with arms 44, 46 extending upward from both sides of a base portion 42. A notched portion 48 is cut out between the arms 44, 46.

Referential numerals 50, 52 are vertically extending electric conductors mounted on the arms 44, 46 respectively. The lower end of the electric conductor 50 is connected to an electric wire 22 shown in FIG. 1. Equidistantly stretched across the electric conductors 50, 52 are a plurality of (seven indicated) fine metal wires 54 in a plane substantially parallel with the direction A in which radiation is brought into the radiation detector. These fine metal wires 54 collectively constitute an electric chargecollecting electrode 55.

Reference numerals 56, 60 are first and second high voltage metal plate electrodes provided with downward projecting terminals 58, 62. The first high voltage electrode 56 is fitted to the support board 40 by adhesive or any other proper means with a pair of spacers 64 disposed therebetween. The second high voltage electrode 60 is fixed to the opposite side of the support board 40 to the first high voltage electrode 56 by adhesive or any other suitable means. The high voltage electrodes 56, 60 are large enough to cover the electric charge-collecting electrode 55 formed of a plurality of fine metal wires 54. The assembly of the fine metal wires 54 lies substantially in the center of a space between the facing surfaces of the first and second high voltage electrodes 56, 60. The terminals 58, 62 of the high voltage electrodes 56, 60 are connected to the electric wire 26 shown in FIG. 1.

The support board 40 fitted with the high voltage electrodes 56, 60 is inserted into the case body 10 from the left side of FIG. 1 by sliding along guide grooves 66 formed in the upper and lower inner walls of the case body 10. The insertion of the support board 40 is stopped when the notch 48 of the support board 40 is brought to face the radiation supply section 16 of the case body 10, and kept in that position by proper means. Thereafter, the electric wires 22, 26 are led out through the bushings 24, 28. After the cap 12 is tightened to the case body 10, a prescribed form of gas is sealed in the case 14 by means of a gassealing device (not shown).

The gas sealed in the case 14 should preferably be formed of a gaseous element mainly consisting of a rare gas such as xenon, argon or krypton having a higher purity than 99.95%. The sealing pressure is chosen to range between 5 and 10 atm.

The above-mentioned fine metal wires 54 should preferably be made of stainless steel, molybdenum or nickel-plated tungsten and be stretched across the electric conductors 50, 52 at a mutual space of 1 to 5mm.

As the material of the high voltage electrodes, tantalum, tungsten, molybdenum, etc. are preferable for the following reason. That is, photons in the radiation fed to the detecting sections of the detectors are absorbed into the atoms of the gaseous element, and their energy is converted into photoelectrons and fluorescent X-rays and then is discharged. In the gaseous element the photoelectrons generate ion pairs of the element, but the fluorescent X-rays have a longer range than the photoelectrons and radiate in all directions. Thus, the fluorescent X-rays come to many radiation detectors and cannot be distinguished from the radiation rays to be detected. This would cause cross talk. To avoid such cross talk, the high voltage electrode, which separate the detectors from one another, are made of tantalum, tungsten, molybdenum or the like each of which has a large photon absorption coefficient.

Figure 3:
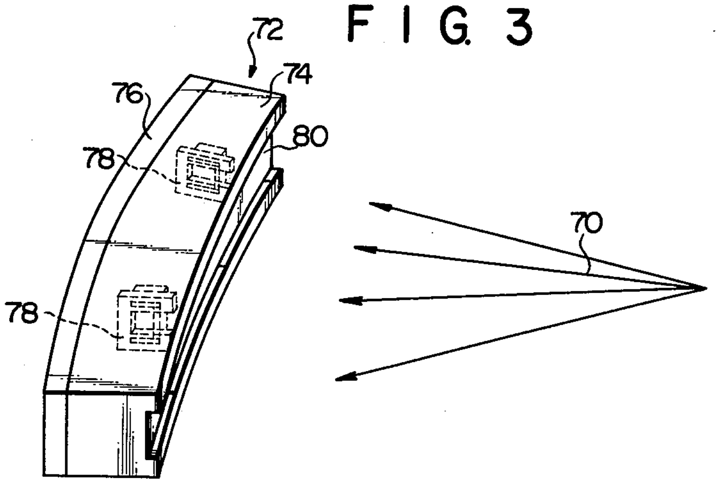
FIG. 3 is an oblique view of a multi-channel type radiation detector embodying the invention.

FIG. 3 fractionally illustrates a multi-channel type radiation detector adapted to measure the intensities of fan beam-type radiation 70 penetrating a foreground subject as applied in computerized tomography. With this type of radiation detector, a plurality of electric charge-collecting electrodes and high voltage electrodes constructed as shown in FIG. 2 are received in a curved case 72 so as to face incoming radiation. The curved case 72 made of aluminum comprises a case body 74 and a lid 76. The case body 74 includes a plurality of detection elements 78 each comprising a combination of a single high voltage electrode and a single electric charge-collecting electrode. (For brevity of presentation, FIG. 3 only indicates two detection elements 78.) A curved thin-walled radiation supply section 80 is provided on that side of the curved case 74 which faces fan beam-type radiation.

There will now be described by reference to FIG. 4 the construction of the detection element 78. An insulation support board 40 comprises a base portion 42 and arms 44, 46 extending from the base portion 42 leftward of the drawing with a notch 48 defined between said arms 44, 46. Reference numerals 50, 52 are electric conductors mounted on the arms 44, 46 respectively. As in FIG. 2, a plurality of parallel fine metal wires 54 are stretched across the electric conductors 50, 52. A high voltage electrode 60 is fitted to the opposite side of the support board 40 to the fine metal wires 54 by adhesive or any other proper means. Reference numeral 82 is a terminal extending from the high pressure electrode 60, and 84 is a terminal extending from the electric conductor 50.

Figure 5:
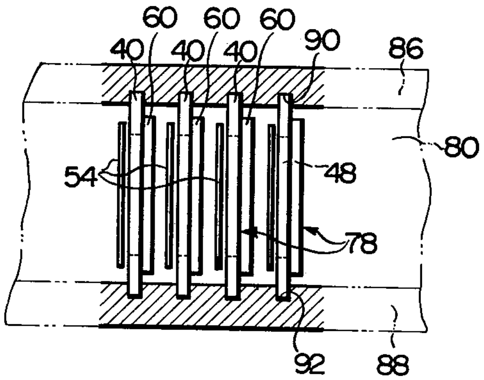
FIG. 5 illustrates the manner in which the detection elements of FIG. 4 are fitted to a multi-channel type radiation detector.

The plural detection elements 78 are arranged in the case body 74 as shown in FIG. 5, which indicates said arrangement as viewed from the left side with the cap 76 taken off the case 72 of FIG. 3. The upper and lower boards 86, 88 of the case body 74 are provided with guide grooves 90, 92 extending in a direction facing incoming radiation. The notch 48 faces incoming radiation. The high voltage electrodes are all set on the same side (the right side of FIG. 5) of the support board 40. Under this condition, the detection elements 78 are inserted into the guide grooves 90, 92. The detection elements 78 are arranged such that the notch 48 faces the radiation supply section 80 (FIG. 3); and the electric charge-collecting electrode 55 (indicated in FIG. 5 by 54 denoting a fine metal wire) of the right side one of every two adjacent detection elements 78 is positioned exactly midway between the high voltage electrodes 60 of said adjacent detection elements 78. After the detection elements are inserted into the above-mentioned grooves 90, 92, the terminals 82 of all the high voltage electrodes 60 are short circuited. Wires (not shown) connected to the respective terminals 82 and the wires (not shown) connected to the terminals of the respective electric charge-collecting electrodes 55 are led out of the curved case 72. The cap 76 is finally mounted on the case body 74. Later, the prescribed gaseous element is sealed in the curved case 72, providing a finished multi-channel type radiation detector.

With the embodiment of FIG. 3, the high voltage electrodes and fine metal wires are made of the same material as in the embodiment of FIG. 1. The fine metal wires have the same diameter and are stretched at the some mutual space as in FIG. 1. Further, a gaseous element having the same kind and purity as in FIG. 1 is sealed in the aluminum case 14 at the same pressure.

There will now be described the properties and function of the radiation detector of this invention. Referring first to the single channel-type radiation detector of FIG. 1, the electric wire 26 is connected to the negative side of a high voltage D.C. source, and the electric wire 22 is connected to the positive side of said high voltage D.C. source or grounded. Then collecting voltage is impressed across the high voltage electrodes 56, 60 and electric charge-collecting electrode 55.

Radiation emitted in the direction of the arrow A of FIGS. 1 and 2 passes through the radiation supply section 16 into an operative space 57 between the high voltage electrodes 56, 60 by travelling substantially parallel with the electric charge-collecting electrode 55 and in a direction substantially perpendicular to that in which the fine metal wires 54 extend, thereby ionizing a gaseous element received in said space 57. As the result, ionization current, that is, output current flows from the electric chargecollecting electrode 55 to the high voltage electrodes 56, 60 which is connected to the negative side of the high voltage D.C. source. Where collecting voltage is gradually increased while radiation of the same intensity is received, then output current changes as indicated by the curve of FIG. 6. Where, with respect to said curve, collecting voltage lies within the range of 300 to 700 volts, then output current from the electric charge-collecting electrode 55 is maintained at a substantially fixed level of amperage. This output current is the so-called saturated current. The above-mentioned voltage range is referred to as "ionization chamber region". Ionization current in the ionization chamber region and in consequence output current from the radiation detector is extremely small.

Where the collecting voltage is raised to a range of 700 to 1,500 volts, then electrons ionized by radiation are prominently accelerated by a strong electric field occurring in the proximity of the fine metal wires 54. The accelerated electrons strike against the molecules of the sealed gas lying near the electric charge-collecting electrode 55 and ionizes the gas molecules to produce new electrons and positive ions. If this action continues with the eventual occurrence of so-called electron avalanche, then gas amplification arises, causing the ionization current to be amplified about 10 to 100 times the aforesaid saturated current. As a result, the radiation detector of this invention generates a considerably large current. The range of the collecting voltage which leads to the above-mentioned gas amplification is generally referred to as "a proportional region". For easy generation of the electron avalanche, it is preferred to reduce the diameter of the fine metal wires 54 as far as the mechanical strength permits, thereby creating a strong electric field in the neighborhood of the fine metal wires 54. Further, the fine metal wires 54 are spaced from each other at a distance of 1 to 5 mm to broaden the dynamic range for measurement of radiation intensity and elevate the sensitivity of said measurement. The radiation detector of this invention constructed in consideration of the above-mentioned facts display such properties as are indicated by the curve of FIG. 7. In FIG. 7, the dose rate of incoming radiation is plotted on the abscissa, and the magnitude of ionization current or output current from the radiation detector is shown on the ordinate, with collecting voltage fixed. The curve shows that even where output current changes substantially linearly relative to the dose rate, and this dose rate varies within such a 4-digit range as 1 mR/min to 10 R/min, output current from the radiation detector of this invention does not deviate from the linear curve.

Inclusion of a small amount (for example 1–10%) of an organic gas such as methane gas in the aforesaid rare gas being sealed in the case 14 is effective to produce stable ionization current.

The multi-channel type radiation detector of FIG. 3 comprises a large number of detection elements as illustrated in FIG. 5. The high voltage electrodes 60 are used in common with the electric charge-collecting electrodes 55 (indicated in FIG. 5 by 54 denoting a fine metal wire) positioned on both sides of the high voltage electrode 60. The case 74 of FIG. 3 contains a large assembly of the same type of single-channel radiation detector as described by reference to FIG. 1. These plural detection elements are arranged in parallel, with the respective electric charge-collecting electrodes 55 positioned to face the incoming fan beam-type radiation 70. This fan beam-type radiation proceeds from the inner peripheral wall of the curved case 74 into the radiation detector through the radiation supply section 80. Gaseous elements sealed in the operative spaces 18 between every adjacent high voltage electrode 60 are ionized according to the intensity of radiation entering said space 18. Output current corresponding to the degree of ionization taking place in said space 18 is allowed to flow through an external circuit. With the embodiment of FIG. 3, collecting voltage ranging from 700 to 1,500 volts is supplied to cause a plurality of single-channel type radiation detector units to be operated in a proportional region. The high voltage electrodes 60 are all connected together in the curved case 72. Their connection to an external high voltage source is effected by a single electric wire (not shown). Output currents from the respective electric charge-collecting electrodes 55 are separately sent forth to the outside of the curved case 72, and then conducted through a proper electron circuit to a computer, where arithmetic operation is carried out to provide a tomographic image of a predetermined planar slice of a foreground subject.

Figure 4:
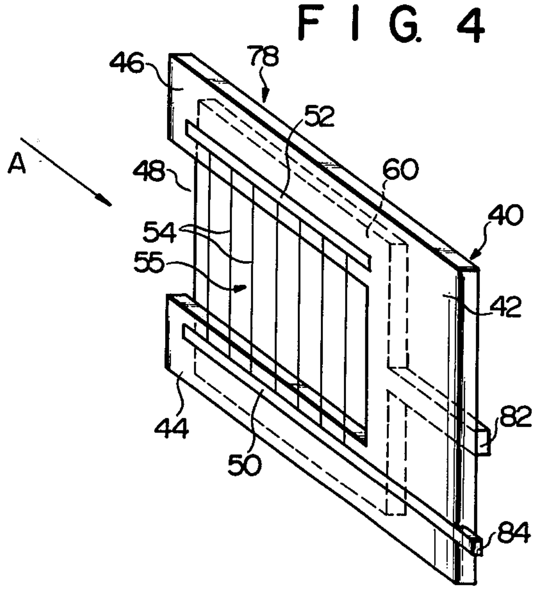
FIG. 4 is an oblique view of one of the plural detection elements incorporated in the radiation detector of FIG. 3.

The multi-channel type radiation detector of FIG. 3 has the advantages that the detection element 78 of FIG. 4 can be made thin, and a large number of said detection elements are arranged close to each other in the curved case 72. Application of a gaseous element for amplification of output current from the radiation detector makes it unnecessary to use a large size photomultiplier and based on the same size as the prior art multi-channel radiation detector, the present radiation detector of FIG. 3 formed of a very large number of detection units can simultaneously provide a far larger amount of data than in the past on the predetermined planar slice of a foreground subject. Where index scanning is made of the foreground subject exposed to fan beam-type radiation, a very distinct minute image can be quickly produced on the prescribed planar slice of the foreground subject. With the multi-channel type radiation detector of FIG. 3, an angle defined by the fan beam-type radiation with both ends of the curved case 72 is not appreciably large. Where, however, mere detection elements 78 are received in the curved case 72 to cause the fan beam-type radiation to define a far large angle with both ends of said curved case 72, then data on the planer slice of a foreground subject can be obtained more quickly. Further, it is possible to provide a straight multi-channel radiation detector instead of a curved one by receiving a plurality of detection elements 78 in a straight case with the respective electric charge-collecting electrodes directed alike to either side of said case.

As mentioned above, the radiation detector of this invention has the following advantages:

(1) The radiation detector is not affected by terrestrial magnetism due to absence of a photoamplifier.

(2) The close position of the electric chargecollecting electrode to the paired high voltage electrodes makes it possible to provide a thin radiation detector. Therefore, a large number of radiation detectors can be arranged at a smaller space than 2 mm, thereby providing a multi-channel type radiation detector as illustrated in FIG. 3.

(3) The radiation detector generates output current of large S/N ratio due to gas amplification.

(4) The radiation detector has a high response to pulsating radiation due to absence of a fluorescent ray-emitting element such as a scintillator and electric field near the electric charge-collecting electrode which is stronger than the electric field in an ionization chamber, and can quickly detect the radiation.

(5) Output current from the radiation detector varies with the intensity of incoming radiation in high linearity.

The above advantages of the radiation detector of this invention prominently elevate the performance of computerized tomography now under development.

What we claim is:

1. A radiation detector which comprises an electric charge-collecting electrode constructed by arranging a plurality of fine metal wires in substantially the same plane; a pair of high voltage electrodes disposed substantially parallel with both sides of the electric charge-collecting electrode; and a case designed to receive the electric charge-collecting electrode and paired high voltage electrodes, filled with a gaseous element substantially impervious to radiation and provided with a radiation supply section enabling radiation to be introduced substantially parallel with said plane of the electric charge-collecting electrode.

2. The radiation detector according to claim 1, wherein the gaseous element sealed in the case is mainly formed of at least one kind selected from the group consisting of rare gases xenon, argon and krypton.

3. The radiation detector according to claim 1, which is operated in a proportional region, with the gaseous element sealed in the case at a pressure of 5 to 10 atm.

4. The radiation detector according to claim 1, wherein fine metal wires constituting the electric charge-collecting electrode have a diameter of 10 to 100 microns and are arranged substantially parallel at a space of 1 to 5 millimeters.

5. The radiation detector according to claim 1, wherein the high voltage electrode is made of at least one selected from the group consisting of tantalum, tungsten and molybdenum.

6. The radiation detector according to claim 1, wherein the high voltage electrode is made of at least one selected from the group consisting of tantalum, tungsten and molybdenum.

7. A radiation detector which comprises a plurality of substantially parallel arranged high voltage electrodes; a plurality of electric charge-collecting electrodes, each of which comprises a plurality of fine metal wires stretched in substantially the same plane and is disposed midway between every two adjacent high voltage electrodes arranged substantially parallel with said plane; and a case designed to receive the high voltage electrodes and electric charge-collecting electrodes, filled with a gaseous element which is considered to be impervious to radiation, and provided with a radiation supply section enabling radiation to be introduced substantially parallel with the plane of each respective electric charge-collecting electrode.

8. The radiation detector according to claim 7, wherein the gaseous element sealed in the case is mainly formed of at least one selected from the group of rare gases xenon, argon and krypton.

9. The radiation detector according to claim 7, which is operated in a proportional region with the gaseous element sealed at a pressure of 5 to 10 atm.

10. The radiation detector according to claim 7, wherein fine metal wires constituting the electric charge-collecting electrode have a diameter of 10 to 100 microns, and are arranged substantially parallel at a space of 1 to 5 millimeters.

11. A radiation detector which comprises a charge-collecting electrode having a plurality of fine metal wires disposed in substantially a single plane; a pair of high voltage electrodes extending substantially parallel with and disposed in a manner to sandwich the charge-collecting electrode; and a casing which houses the charge-collecting electrode; and the high voltage electrodes, contain 5 to 10 atms. of a gaseous material including as the main component at least one element selected from xenon, argon and krypton which are substantially opaque to radiation, and is provided with a radiation inlet port permitting the radiation to enter substantially parallel with the single plane of the charge-collecting electrode; wherein the voltage applied between the charge-collecting electrode and the high voltage electrodes permits the detector to operate in a proportional region.

* * * * *